UNITED STATES PATENT OFFICE.

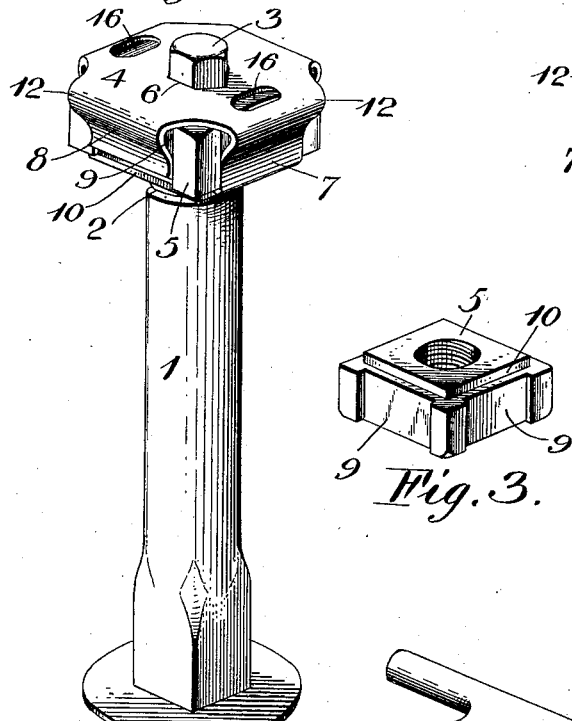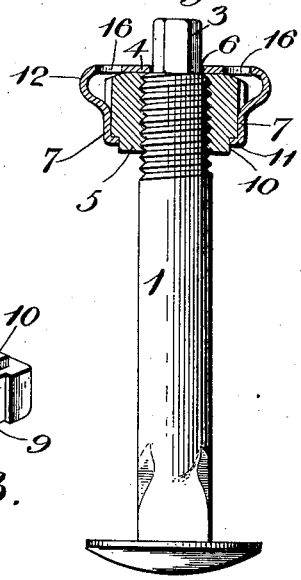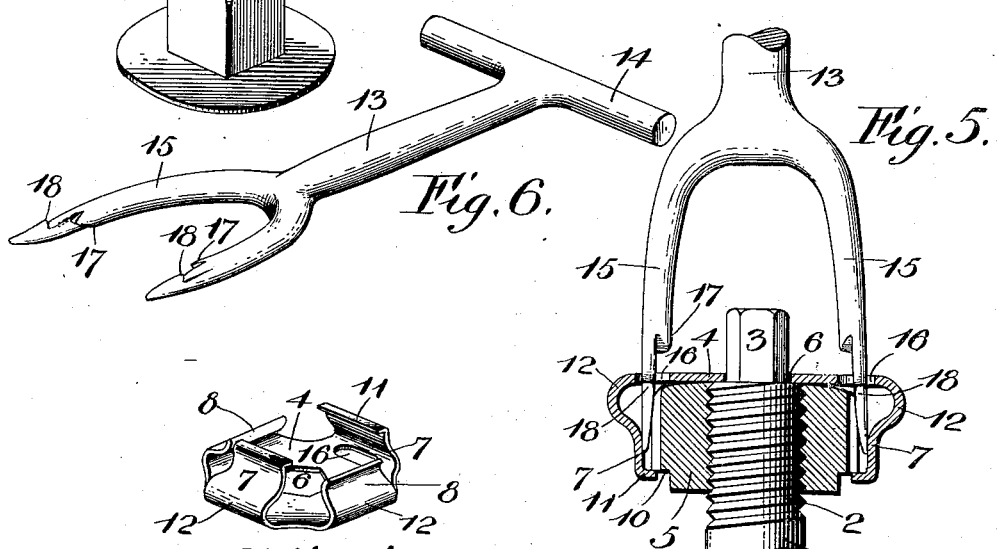

JOHN ROHLIN, OF EUREKA, KANSAS, ASSIGNOR OF ONE-HALF TO A. E. SHAW, OF SAME PLACE.

NUT-LOCK.

SPECIFICATION forming part of Letters Patent No. 606,582, dated June 28, 1898.

Application filed October 12, 1897. Serial No. 654,994. (No model.)

*To all whom it may concern:*

Be it known that I, JOHN ROHLIN, a citizen of the United States, residing at Eureka, in the county of Greenwood and State of Kansas, have invented a new and useful Nut-Lock, of which the following is a specification.

The invention relates to improvements in nut-locks.

The object of the present invention is to improve the construction of nut-locks and to provide a simple, inexpensive, and efficient device capable of securely locking a nut against accidental unscrewing and adapted to permit the same to be readily removed when desired.

A further object of the invention is to provide a nut-lock which will be applicable to rail-joints and various other constructions where it is desirable to lock a nut on a bolt or other threaded part.

The invention consists in the construction and novel combination and arrangement of parts, as hereinafter fully described, illustrated in the accompanying drawings, and pointed out in the claims hereto appended.

In the drawings, Figure 1 is a perspective view of a nut-lock constructed in accordance with this invention and shown applied to a bolt. Fig. 2 is a longitudinal sectional view of the same. Fig. 3 is a detail perspective view of the nut. Fig. 4 is a similar view of the locking-plate. Fig. 5 is a sectional view illustrating the manner of removing the locking-plate from the nut. Fig. 6 is a detail perspective view of the forked tool for removing the locking-plate.

Like numerals of reference designate corresponding parts in all the figures of the drawings.

1 designates a bolt provided at the outer extremity of its threaded portion 2 with a polygonal or non-circular extension 3, on which is arranged a locking-plate 4, rigid with the bolt 1 when in position and adapted to engage a nut 5 and lock the same against accidental unscrewing. The locking-plate is provided with a polygonal opening 6 at its center to receive the polygonal extension 3 of the bolt, and it is provided with integral resilient arms 7 and 8, agreeing in number with the number of faces of the nut and engaging the same, as clearly illustrated in Fig. 1 of the accompanying drawings.

The nut 5, which may be square or any other desired shape, is provided at its side faces with recesses 9 to receive the arms 7 and 8, and its rear face is recessed at its outer edges, adjacent to its side faces, at 10 to receive inwardly-projecting flanges 11 of the arms 7, whereby the locking-plate is retained on the bolt and the nut and is prevented from being drawn outward until unlocked.

The inwardly-extending flanges 11 of the arms 7 are adapted to engage the back of the nut at any of the side faces thereof, and the recesses 9 receive snugly the engaging portions of the arms 7 and 8, which are supported by such recessing. The recesses 9 form shoulders at the side edges of the arms and serve to prevent any vibration of the nut, the locking-plate, or the bolt.

The arms 7 and 8 are bowed outward at 12, adjacent to the body portion of the plate, to form springs of them, and this construction also facilitates the unlocking of the arms 7 by a forked tool 13, provided with a handle 14 and adapted to have the sides 15 of its fork inserted through side openings 16 of the locking-plate and engaged with the inner faces of the arms 7. The tool is introduced into the locking-plate at an angle, the inward movement of the sides 15 being limited by shoulders 17, which form a fulcrum for the tool, and when the latter is swung sufficiently to bring it in alinement with the bolt the arms 7 are spread sufficiently to disengage the flanges 11 from the recesses at the back of the nut. The sides 15 of the tool are also provided with shoulders 18, adapted to engage the inner face of the plate and obtain a sufficient hold on the same, so that the locking-plate may be readily drawn off the bolt and the nut.

The invention has the following advantages: The nut-lock is simple and comparatively inexpensive in construction. It is applicable to bolts, spindles of axles, and various other constructions and is capable of locking a nut against accidental unscrewing. The locking-plate may be readily removed from the bolt and the nut when it is desired to release the latter, and the removal of the locking-plate does not injure it or in any wise impair its future usefulness.

Changes in the form, proportion, and minor details of construction may be resorted to without departing from the spirit or sacrificing any of the advantages of this invention.

What I claim is—

1. The combination with a bolt having a polygonal portion, and a nut arranged on the bolt, of a locking-plate having spring-arms detachably interlocked with the nut and bowed outward adjacent to the front face of the same, said locking-plate being provided with openings adapted to permit a tool to be introduced into the bowed portions, substantially as and for the purpose described.

2. In a nut-lock, the combination with a bolt having a polygonal extension, and a nut arranged on the bolt, of a locking-plate having an opening to fit the extension and provided with spring-arms engaging the side faces and the back of the nut and bowed outward adjacent to the front face of the same, said plate being provided with side openings adapted to permit a tool to be introduced into the bowed portions, substantially as described.

In testimony that I claim the foregoing as my own I have hereto affixed my signature in the presence of two witnesses.

JOHN ROHLIN.

Witnesses:
   CHAS. E. MOORE,
   MAY M. MOORE.